United States Patent [19]

Ooba et al.

[11] Patent Number: 4,899,224
[45] Date of Patent: Feb. 6, 1990

[54] RECORDING APPARATUS AND METHOD UTILIZING AN ARRAY OF LIQUID CRYSTAL CELLS

[75] Inventors: Yuji Ooba, Tokyo; Shigeo Sugihara, Kunitachi; Tadaaki Masumori, Kodaira; Shinichi Shiwa, Yokosuka, all of Japan

[73] Assignee: Nippon Telegraph and Telephone Corporation, Tokyo, Japan

[21] Appl. No.: 210,448

[22] Filed: Jun. 23, 1988

[30] Foreign Application Priority Data

Jul. 3, 1987 [JP] Japan .................. 62-165186
Dec. 1, 1987 [JP] Japan .................. 62-301411
Dec. 1, 1987 [JP] Japan .................. 62-301412

[51] Int. Cl.$^4$ ............................................. H04N 5/76
[52] U.S. Cl. ...................... 358/332; 346/160; 350/356
[58] Field of Search .............. 358/310, 335, 332, 75, 358/345; 346/107 R, 110 R, 160; 350/353, 355, 356, 331 R

[56] References Cited

U.S. PATENT DOCUMENTS

| | | | |
|---|---|---|---|
| 4,366,499 | 12/1982 | Mir | 358/75 |
| 4,374,397 | 2/1983 | Mir | 358/75 |
| 4,743,927 | 5/1988 | Sasaki | 346/160 |
| 4,745,433 | 5/1988 | Fujmura et al. | 346/160 X |
| 4,745,490 | 5/1988 | Shimizu et al. | 346/160 |
| 4,810,058 | 3/1989 | Sangyoji et al. | 350/331 R |

FOREIGN PATENT DOCUMENTS 0165550 12/1985 European Pat. Off. .
61103122 9/1986 Japan .

Primary Examiner—Robert L. Richardson
Attorney, Agent, or Firm—Pollock, Vande Sande and Priddy

[57] ABSTRACT

A two-dimensional recording head is provided which controls respective windows of a liquid crystal cell array to open and close for light and can hold them in the opened and closed states. A light source is disposed at one side of the head, at the other side of which are disposed an image-forming lens system for exposing a recording medium to an image formed on the head by the opened and closed states of the windows. A controller is provided for controlling the quantity of light which is applied to the recording medium. The image is written into the head by a binary image signal and the exposure is started, with the written image held unchanged. The controller stops the exposure when the quantity of light applied to the recording medium reaches a predetermined value.

27 Claims, 9 Drawing Sheets

| t | X : E = 1 | | Y : E = 14 | | Z : E = 43 | |
|---|---|---|---|---|---|---|
| | Cw2 | Cw1 | Cw2 | Cw1 | Cw2 | Cw1 |
| $2^0$ | 0 | 1 | 1 | 0 | 1 | 1 |
| $2^1$ | 0 | 0 | 0 | 1 | 0 | 1 |
| $2^2$ | 0 | 0 | 0 | 1 | 1 | 0 |
| | 0x8 | 1x1 | 1x8 | 6x1 | 5x8 | 3x1 |

RECORDING APPARATUS AND METHOD UTILIZING AN ARRAY OF LIQUID CRYSTAL CELLS

BACKGROUND OF THE INVENTION

The present invention relates to a recording apparatus for recording a two-dimensional image containing a half tone on a photosensitive sheet in accordance with an image signal. The invention also pertains to a recording method using such an apparatus.

As a prior art example of such a recording apparatus, an apparatus which photographs an image displayed on the screen of a CRT is disclosed in U.S. Pat. No. 4,438,453, for instance. The recording apparatus using the CRT cannot easily be reduced in size, and non-uniformity of a fluorescent material of the CRT incurs non-uniform illumination on the screen, making accurate half-tone recording difficult. Further, the image displayed on the screen is distorted in the marginal portions thereof, and the bright spot becomes larger with an increase in brightness, that is, resolution varies with the brightness.

As a half-tone recording apparatus free from such defects, there is disclosed in Japanese Patent Application Laid Open No. 103122/86 a printer which displays a two-dimensional image by liquid crystal cells arranged in a matrix form and records the image by forming it on a photosensitive sheet through exposure. In this Japanese application it is described that, in the case of recording n gradations, exposure is carried out (n−1) times each for the same period of time and each liquid crystal cell is driven to transmit therethrough light (ON) by the same number of times as the value of gradation of the corresponding pixel. Moreover, it is also disclosed that, to reduce the number of times of exposure involved for each image recording, the light transmittance of each liquid crystal cell during exposure is varied in proportion to powers of 2, i.e. $2^0, 2^1, 2^2, \ldots$ and a combination of exposures weighted by such variations of the transmittance are used for recording a plurality of gradations. According to the recording apparatus described in this Japanese application, however, it is difficult to implement accurate gradation recording, because the scatter of response of the liquid crystal cells leads to dispersion of the amount of exposure and because variations in the intensity of light from a light source also cause variations in the amount of exposure. Furthermore, the optical response characteristics of the matrix-arranged liquid crystal cells which are driven under the same condition are scattered and readily affected by temperature. Accordingly, there is a variation in the amount of light to which a pixel corresponding to each liquid crystal cell is exposed. Even if a liquid crystal cell array which is free from the scatter of the optical response characteristics of individual liquid crystal cells could be obtained, voltage applied to the cells varies due to a voltage drop by the resistance of an access line of the matrix, resulting in dispersion of the response speed of the cells. Therefore, it is difficult to appey an accurate amount of light corresponding to the gradation of the image to a pixel area on the photosensitive sheet corresponding to each liquid crystal cell.

SUMMARY OF THE INVENTION

It is therefore an object of the present invention to provide a recording apparatus which permits precise control of the amount of exposure for recording the gradation of each pixel, and a recording method using the apparatus.

Another object of the present invention is to provide a recording apparatus which ensures accurate exposure of a photosensitive sheet regardless of variations in the intensity of light from a light source.

Yet another object of the present invention is to provide a recording apparatus which enables accurate recording of many half tones with a small number of times of exposure.

The recording apparatus of the present is provided with: a two-dimensional liquid crystal recording head having a plurality of windows arranged in two dimensions, the windows being capable of controlling the transmission and interception (open, close) of light in accordance with a binary image signal and retaining the opened and closed states; a light source disposed at the side of one of the principal surfaces of the two-dimensional recording head, for applying light to the said one surface of the head; medium holding means fixedly positioned at the side of the other principal surface of the two-dimensional recording head, for holding a recording medium; an optical system disposed between the two-dimensional recording head and the medium holding means, for projecting onto the recording medium an image represented by the opened and closed states on the two-dimensional recording head; and exposure control means for controlling the light applying means so that the amount of light, which is applied from the light source to the recording medium through the two-dimensional recording head while the head retains the opened and closed state, becomes equal to a predetermined value.

In recording a multiple-gradation image by the recording apparatus of the present invention, digital gradation data is used in which the gradations of respective pixels of the image to be recorded are represented by binary numbers of the same predetermined number of digits. The recording method of the present invention includes (a) a writing step in which values 0 or 1 of respective bits at the same digit in the respective gradation data (the groups of these bits will hereinafter be referred to as bit planes) are applied as a binary image signal to the two-dimensional recording head to open or close the corresponding windows of the two-dimensional recording head in accordance with the values 1 or 0 of these bits; (b) a step of generating an exposure start signal after completion of the writing step; (c) a step in which, in response to the exposure start signal, light from the light source is applied to the recording medium through the two-dimensional recording head holding the opened and closed state, thus starting exposure; (d) a step of stopping the exposure at the same time as the amount of light applied to the recording medium reaches an exposure value corresponding to the weight of the said one digit; and a step of performing the steps (a) to (d) for every digit of the gradation data.

As briefly described above, according to the present invention, since the rise and fall of the open-close operation of the two-dimensional recording head using liquid crystal, which is a main factor of dispersion in exposure in the prior art recording apparatus, have nothing to do with exposure, the recording medium can be subjected to accurate exposure with no dispersion of the amount of light for each window of the head.

DESCRIPTION OF THE PREFERRED EMBODIMENTS

Figure 1:
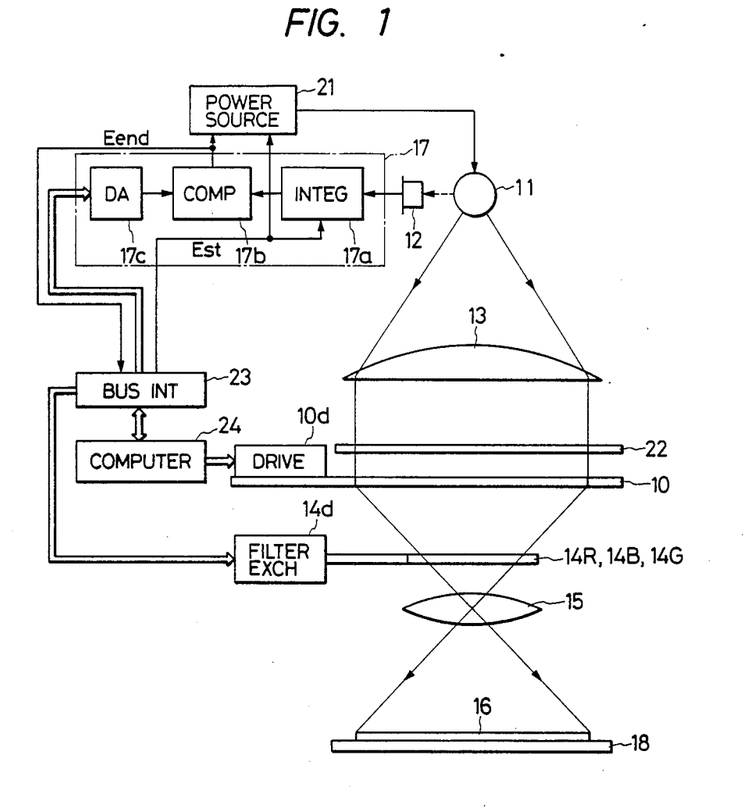
FIG. 1 is a schematic diagram showing the basic arrangement of an embodiment of the recording apparatus of the present invention in which a light source is controlled to obtain a desired amount of exposure.

FIG. 1 shows a basic arrangement of the recording apparatus of the present invention, for explaining an embodiment thereof. A light source 11 is disposed at one side of a two-dimensional recording head 10, at the other side of which is disposed a recording medium, i.e. a photosensitive sheet 16 placed on a holder 18. This embodiment employs, as the light source 11, a white light source which is quick in its ON-OFF response, such as a xenon arc lamp. The two-dimensional recording head 10 comprises a liquid crystal cell array which has a plurality of windows arranged in a two-dimensional matrix form as will be explained later. The windows are each controlled by a binary image signal to permit or inhibit the passage therethrough of light (i.e. subjected to ON-OFF control) and can remain in the controlled state for a period of time longer than at least a predictable longest exposure time. Disposed forwardly of the light source 11 is a collimator lens 13 which renders light from the light source 11 into parallel rays, and a light diffusing plate 22 is disposed in proximity to the two-dimensional recording head 10 between head 10 and the lens 13. Intermediate between the head 10 and the holder 18 there are disposed a color filter exchanger 14d which selectively inserts red, blue and green color filters 14R, 14B and 14G into the optical path in response to a color signal contained in the image signal and a lens system 15 by which an image formed on the head 10 in accordance with the image signal is focused onto the photosensitive sheet 16.

The light source 11 can be switched ON and OFF by ON-OFF control of the output power from a power source circuit 21 for the light source 11. A portion of light from the light source 11 is sensed by a photosensor 12, the output from which is applied to an exposure controller 17, as a light quantity signal corresponding to the quantity of light (power) which is applied to the photosensitive sheet 16. The exposure controller 17 includes an integration circuit 17a which integrates the light quantity signal from the photosensor 12, a comparator 17b which compares the integrated output with a preset exposure value and yields an exposure end signal Eend when the former exceeds the latter, and a digital-to-analog converter 17c which converts a given digital set exposure value Ev into analog form for input into the comparator 17b. The power source circuit 21 and the exposure controller 17 are connected via a bus interface 23 to a personal computer 24. The personal computer 24 is also connected to a drive circuit 10d for the two-dimensional recording head 10 and to the color filter exchanger 14d via the interface 23.

Figure 2:
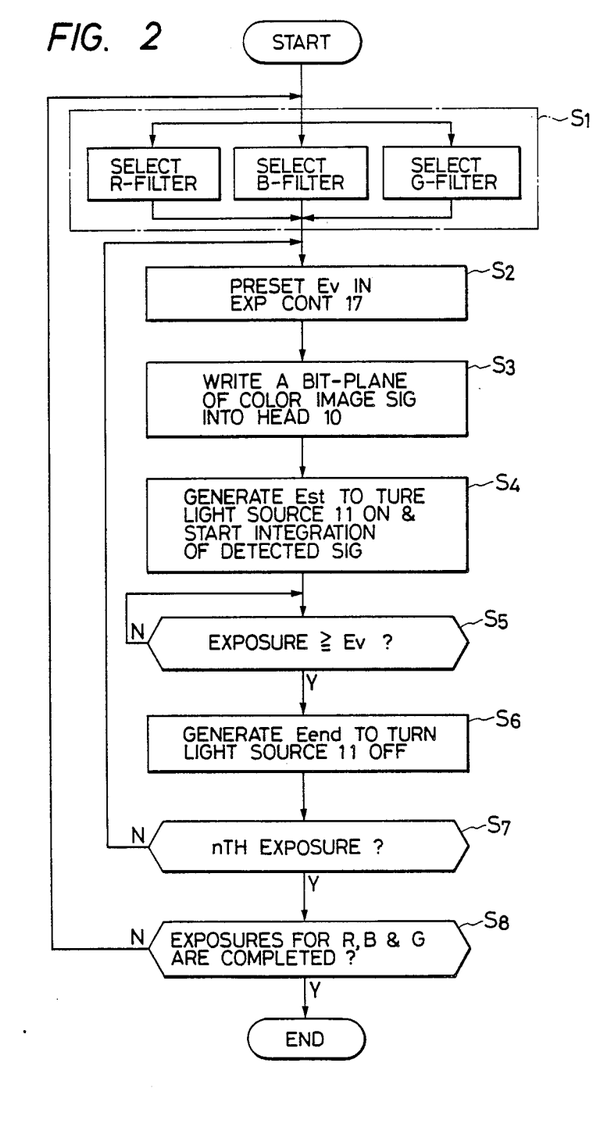
FIG. 2 is a flowchart for explaining the recording of a color image by the recording apparatus shown in FIG. 1.

Next, a description will be given, with reference to the flowchart of FIG. 2, of the recording of a color image by the recording apparatus depicted in FIG. 1. With the apparatus of the present invention, the photosensitive sheet 16 is exposed a plurality of times with different exposures for each color so as to record an image with a plurality of gradations, as described later in detail.

The personal computer 24 generates red, blue and green color gradation data (which is also referred to simply as image data and each represented by a binary number of the same number of bits, n) of a color image to be recorded. Alternatively, the personal computer 24 receives color image data from the outside, performs data processing for decomposing the image data into n bit planes described later and then stores the processed data in a storage means in the computer 24. When the recording apparatus is ready for operation, the personal computer 24 issues an instruction, in step $S_1$, via the bus interface 23 to the color filter exchanger 14d to insert the red filter 14R into the optical path. In the next step $S_2$ the personal computer 24 provides via the bus interface 23 to the D-A converter 17c a first one of exposure values Ev for the exposures that are to be carried out successively for red color light. In the next step $S_3$ bit data of one of n bit planes in the image data stored in the personal computer 24 is applied as a binary image signal to the drive circuit 10d of the two-dimensional recording head 10, thereby sequentially controlling the matrix-arranged cells to open or close in accordance with the image signal. Upon completion of writing the image signal into the head 10, the computer 24 generates an exposure start signal Est in step $S_4$ and applies it via the interface 23 to the power source circuit 21 to turn ON the power supply to the light source 11, lighting it. At the same time, the computer 24 provides the signal Est to the integration circuit 17a, causing it to start the integration of detected light quantity signal from the photosensor 12.

The comparator 17b always compares the integrated output from the integration circuit 17a with the set exposure value Ev converted by the D-A converter 17c into analog form, as shown in step $S_5$. When the output voltage of the integration circuit 17a becomes equal to the set exposure value Ev, the comparator 17b yields and applies a high-level output, as the exposure end signal Eend, to the power source circuit 21, cutting off the power supply to the light source 11 in step $S_6$. At the same time, the exposure end signal Eend is provided to the personal computer 24 as well. Then it is determined in step $S_7$ whether or not the exposure has been carried out the required number of times n. If not, the process goes back to step $S_2$, in which the next exposure value Ev is set in the D-A converter 17c, and in step $S_3$ data of another bit plane in the afore-mentioned red image data is written as a binary image signal into the two-dimensional recording head 10. Then the photosensitive sheet 16 is exposed again in steps $S_4$ to $S_6$ in the same manner as described above, and steps $S_2$ to $S_7$ are repeated until the photosensitive sheet 16 is exposed the predetermined number of times n. Thus the exposure of the photosensitive sheet 16 to the red light is completed.

When it is determined in step $S_8$, after exposing the photosensitive sheet 16 n times, that the exposure for all the colors R, G and B has not been completed yet, the process returns to step $S_1$, in which the computer 24 issues an instruction to exchange the red color filter 14R for the blue one 14B through which the photosensitive sheet 16 is to be exposed next. The filter exchanger 14d responds to this instruction to exchange the red color filter 14R for the blue one 14B. Following this, the photosensitive sheet 16 is exposed to the blue light in the same fashion as is the case with the exposure through the red color filter 14R. This is followed by similarly exposing the photosensitive sheet 16 to the green color light. In this way, recording of one color image is carried out.

As will be seen from the above, the recording apparatus of the present invention writes an image signal into the two-dimensional recording head 10 for each color light and exposes the photosensitive sheet 16 to the color light only within a period of holding the image signal as written in the head 10, and the exposure is controlled with the detected quantity of light by the photosensor 12 so that it becomes equal to a preset exposure value. Accordingly, an accurate exposure can be applied to the photosensitive sheet 16 without being affected by variations in the response speed of the liquid crystal cell array and by fluctuations in the intensity of light from the light source 11. Furthermore, as will be understood from FIG. 1, since multiple exposures can be achieved without the need of changing the relative positional relationships of the head 10, the light source 11, the collimator lens 13, the lens system 15 and the photosensitive sheet 16, corresponding pixel positions of respective color images on the photosensitive sheet 16 do not shift. On this account, the method of the present invention is free from the problems of color misregistration and moire which are encountered in the conventional method using a one-dimensional recording head in combination with mechanical scanning; therefore, the present invention permits recording of an image of excellent color reproducibility.

In the embodiment shown in FIG. 1, if the power source circuit 21 supplies substantially a constant voltage to the light source 11 to light it and if the light source 11 emits light at a constant intensity, then the photosensor 12 yields substantially a constant detected output; and when the set exposure value is changed, the exposure time will automatically vary substantially in proportion to the exposure value. In such an instance, the integration circuit 17a and the comparator 17b can be considered to operate as an analog timer in cooperation with each other. Accordingly, the integration circuit 17a, the comparator 17b and the photosensor 12 may also be replaced with a digital timer circuit which yields a high-level output when it has counted clock pulses of a fixed period by a preset number corresponding to the exposure value.

In the case where the light source 11 is formed by, for example, a light emitting diode whose light intensity can easily be controlled by a drive current and the power source circuit 21 is adapted to supply the light source 11 with a current substantially proportional to a preset exposure value, then the required exposure time will become almost constant at all times even if the exposure value is altered. Also in this case, even if the light intensity of the light source 11 fluctuates, the exposure controller 17 will adjust the exposure time so that the total exposure will become equal to the set exposure value.

Figure 3:
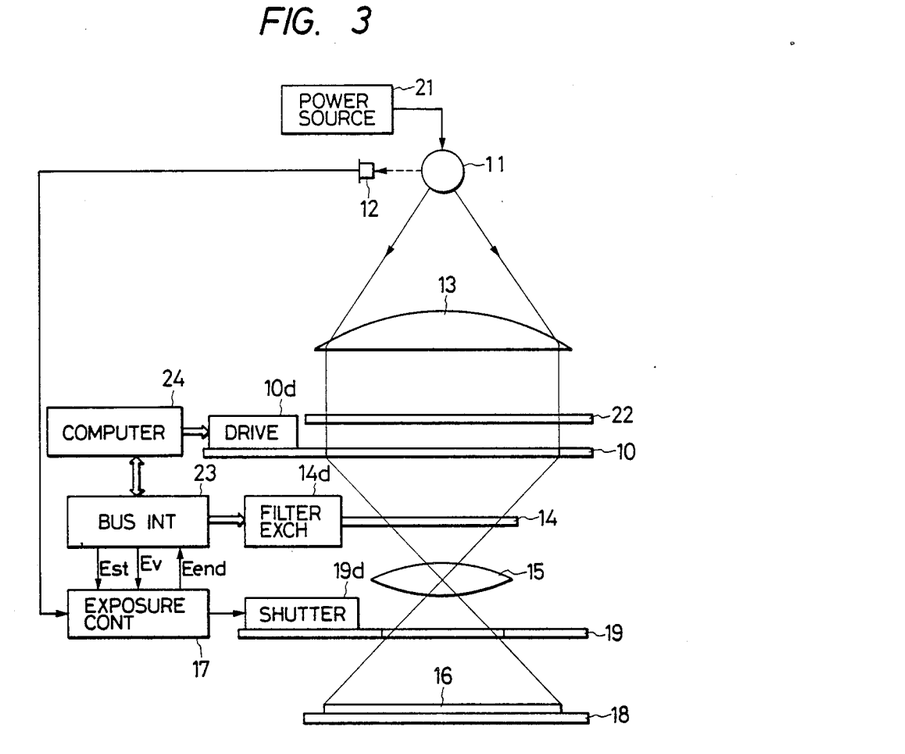
FIG. 3 is a schematic diagram showing the basic arrangement of another embodiment of the recording apparatus of the present invention in which the amount of light from the light source is controlled by a shutter.

FIG. 3 illustrates another embodiment of the present invention, which keeps the light source 11 in the ON state at all times and controls the exposure by opening and closing a shutter, instead of effecting ON-OFF control of the light source 11 as in the embodiment of FIG. 1. The relative positional relationships among the two-dimensional recording head 10, the light source 11, the collimator lens 13, the diffusing plate 22, the lens system 15, the photosensitive sheet 16 and the holder 18 are the same as in FIG. 1. A shutter 19 is disposed at a desired position in the optical path from the light source 11 to the photosensitive sheet 19, for instance, between the image forming lens system 15 and the photosensitive sheet 16, in this embodiment. The exposure controller 17, similar to that employed in the embodiment of FIG. 1, provides a control signal to a shutter drive circuit 19d, by which, as is the case with the control of the power source circuit 21 in FIG. 1, the shutter 19 is opened after completion of writing an image signal into the head 10 and is closed after a predetermined exposure value is reached.

When the light source 11 is formed by, for example, a W lamp or LED capable of stable illumination, the photosensor 12 used in FIG. 3 is left out but instead a constant voltage from a reference voltage source (not shown) is applied to the integration circuit 17a (see FIG. 1) in the exposure controller 17, in which case the integration circuit 17a will serve as a timer in cooperation with the comparator 17b. That is to say, the exposure can be controlled in terms of the exposure time alone in this case.

Figure 4:
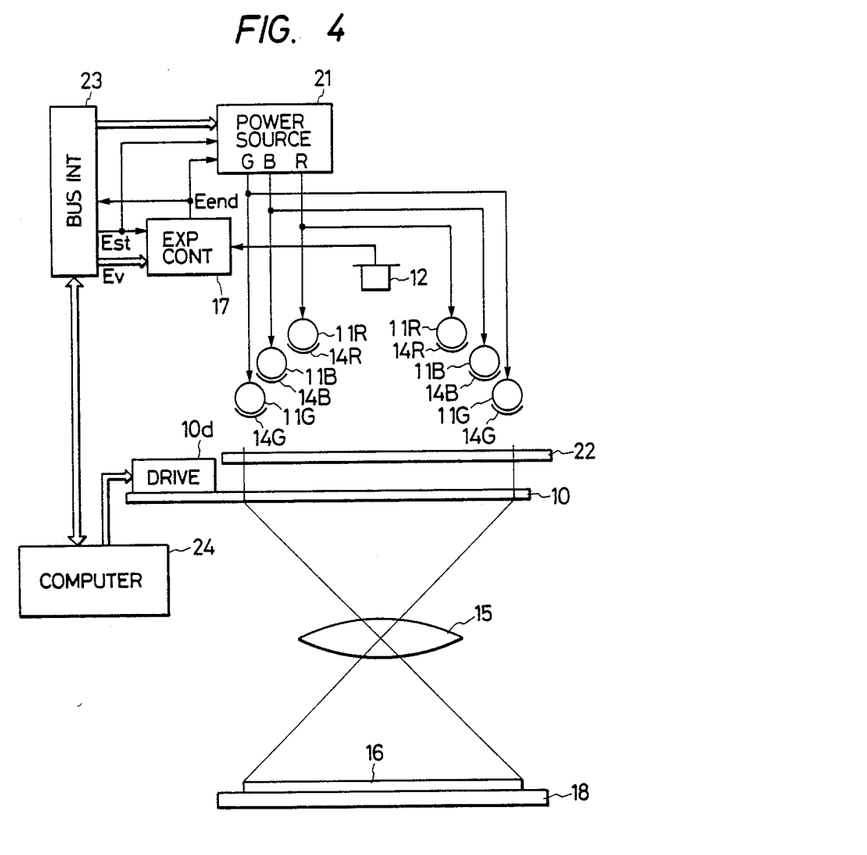
FIG. 4 is a schematic diagram showing the basic arrangement of another embodiment of the recording apparatus of the present invention which employs, as the light source, red, blue and green fluorescent lamps.

FIG. 4 illustrates another embodiment of the present invention, in which the light source 11 is formed by cold (or hot) cathode fluorescent lamps 11R, 11B and 11G which emit light at different dominant wavelengths respectively corresponding to the three primary colors. This embodiment is substantially identical in basic arrangement with the embodiment depicted in FIG. 1. Since cold or hot cathode lamps which emit light in different colors are easily available and quick in response, accurate exposure control can easily be effected through ON-OFF control of them. In this embodiment pairs of, for instance, bar-shaped fluorescent lamps 11R, 11B and 11G of red, blue and green colors are disposed symmetrically. Although this embodiment does not employ the color filters 14R, 14B and 14G which are mechanically exchanged as described previously with regard to FIGS. 1 and 3, color filters 14R, 14B and 14G may also be attached to respective fluorescent lamps so as to increase the color purity of light emitted therefrom.

In this embodiment, prior to exposure to each color light, the personal computer 24 provides a color select signal via the bus interface 23 to the power source circuit 21 in accordance with a color signal imparted to the image signal so that the power source circuit 21 becomes ready to light the fluorescent lamps of a color specified by the color select signal. This embodiment permits electrical switching of colors, and hence achieves color recording in a shorter time than in the case of mechanical switching and with no mechanical vibration or shock. Moreover, the recording apparatus operates entirely electrically and is therefore highly reliable.

Figure 5:
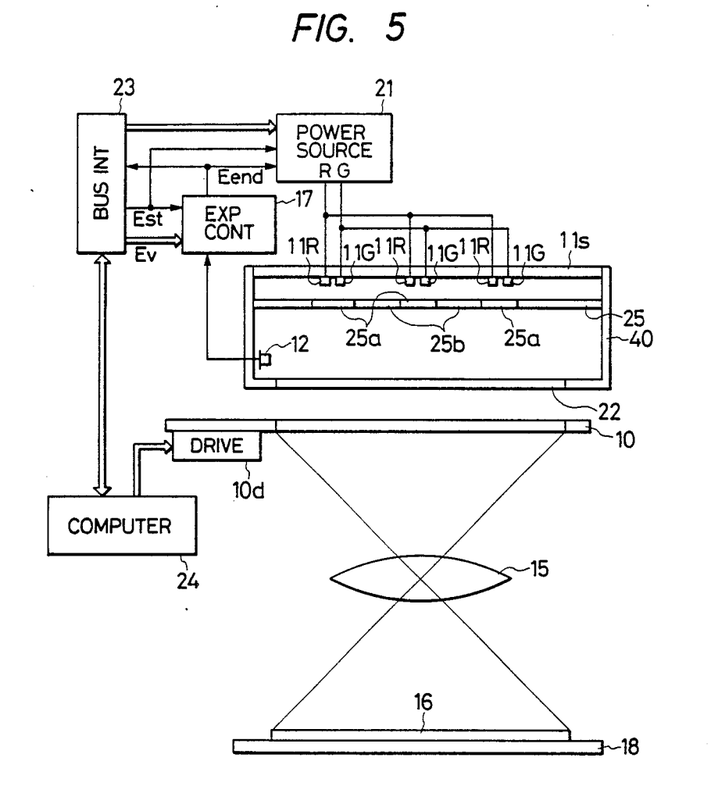
FIG. 5 is a schematic diagram showing the basic arrangement of another embodiment of the recording apparatus of the present invention which employs, as the light source, red and green light emitting diodes.

FIG. 5 illustrates another embodiment of the present invention, which employs, as the light source 11, red and green light emitting diodes 11R and 11G but has substantially the same basic arrangement as that of the FIG. 4 embodiment. In this embodiment, a light box 40 is provided which shields light, and pairs of light emitting diodes 11R and 11G are arranged in a 3 by 3 matrix form on a base plate 11s which forms a rear panel of the box 40. The diffusing plate 22 is disposed in a manner to close a front opening of the light box 40. A partial diffusing plate 25, which has light diffusing regions 25a opposite the respective diode pairs and transparent regions 25b in the other portions, is disposed between the base plate 11s and the diffusing plate 22, for providing a uniform light intensity distribution throughout the diffusing plate 22. In this embodiment, since exposure is carried out for only two colors, recording in natural colors is impossible, but, by a multi-graded combination of red and green colors, recording in many mixed colors is possible. Furthermore, since the light box 40 can be formed thin, the overall length of the apparatus can be reduced by using, for example, a self-focusing rod lens array as the lens system 15.

Figure 6:
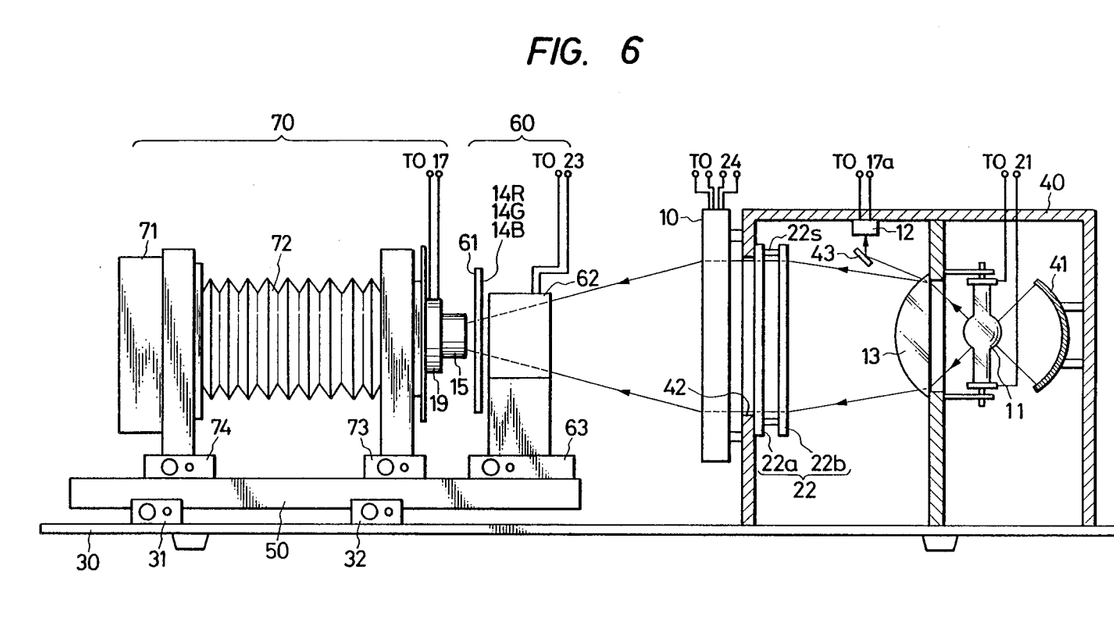
FIG. 6 is a side view, partly in section, illustrating examples of concrete arrangements of an optical system and a mechanical portion of the apparatus shown in FIG. 1.

FIG. 6 is a side view of the FIG. 1 embodiment, concretely showing its mechanical construction including the optical system. The recording apparatus is composed basically of a light box 40 mounted on a common chassis 30, the two-dimensional recording head 10 mounted on the light box 40 in adjacent but spaced relation to its opening 42 for the emission therethrough of light, a carriage 50 mounted on the chassis 30 in such a manner that its positional relationship to the light box 40 is adjustable by adjusters 31 and 32, and a color filter exchanger 60 and a camera unit 70 both mounted on the carriage 50. This mechanical section is placed in a black box not shown.

In the light box 40 fixed to the chassis 30 a xenon arc lamp is provided as the white light source 11 and a concave mirror 41 is disposed behind it. Light direct from the lamp 11 and reflected light from the concave mirror 41 are applied through the lens 13 to the diffusing plate unit 22 disposed on the inside of the front panel of the light box 40 and covering the opening 42 made in the front panel. Since the diffusing plate unit 22 is composed of a pair of parallel diffusing plates 22a and 22b spaced by a spacer 22s, the intensity distribution of light which is diffused by the diffusing plate 22b toward the opening 42 can be made highly uniform in the plane of the opening 42. A portion of the light from the lens 13 is reflected by a mirror 43 to the photosensor 12 for measuring the quantity of light. The two-dimensional recording head 10 is mounted on the front panel of the light box 40, covering the opening 42 from the outside thereof.

The color filter exchanger 60 comprises a rotary disc 61, a stepping motor 62 for rotating it, and an adjuster 63 for mounting the rotary disc 61 and the stepping motor 62 on the carriage 50 in such a manner that they can be adjusted in position. The rotary disc 61 has four centrally-disposed round holes (not shown) made therein at 90° intervals, and three of the four holes are covered with the red, blue and green filters 14R, 14B and 14G mounted on the disc 61. The remaining hole is covered with a light-shielding blind plate for balancing the weight of the disc 61. The rotary disc 61 is turned by the stepping motor 62 to insert a desired one of the color filters into the optical path.

The camera unit 70 comprises the image forming lens 15, a film chamber 71, and bellows 72 interconnecting them. The lens 15 is mounted on an adjuster 73 which adjusts the position of the lens 15 for adjusting the size of an image to be formed. The film chamber 71 is mounted on an adjuster 74 so that the photosensitive sheet (a photographic film) 16 can be positioned at the position of an image to be formed by the lens 15. In this example, the shutter 17 is provided behind the image-forming lens 15 in such a manner that the exposure can be controlled either by ON-OFF control of the light source 11 or open-close control of the shutter 17. The film chamber 71 corresponds to the holder 18 in FIG. 1 and a commercially available film pack is loaded, as the photosensitive sheet 16, in the chamber 71.

No description will be given of the electrical system for operating this apparatus and its operation since they are the same as those of the apparatus shown in FIG. 1.

Next, a description will be given, with reference to FIG. 7, of an example of the arrangement of the two-dimensional recording head 10 for use in the embodiments depicted in FIGS. 1 to 6. In the present invention it is necessary that the windows of the two-dimensional recording head 10 be held in the light transmitting or intercepting state at least during exposure. To meet this requirement, a matrix arrangement of liquid crystal cells 10c is employed in this example. The matrix-arranged liquid crystal cells 10c are formed in the central portion of a substrate 10s. To reduce the wiring density, drive lines are led out every other row and column in horizontal and vertical directions in FIG. 7 and connected to drive circuits 10d provided in marginal portions of the substrate 10s via connection wiring portions 10w formed outside the four sides of the cell array 10c. The cell array 10c is sandwiched between a pair of polarizing plates not shown. The drive circuits 10d are connected to, for example, the personal computer 24 shown in FIG. 1.

A ferroelectric liquid crystal cell array, which has a storage function by itself, is suitable for use as the liquid crystal cell array, but a super-twist liquid crystal cell array can also be employed. From the viewpoint of the driving system for the cell array, a direct multiplex addressed type array is preferable because the aperture ratio of each cell can be obtained, as described later. It is also possible, however, to use a so-called active matrix addressed cell array in which a thin film transistor or other type of switching element is provided for each cell.

Figure 7:
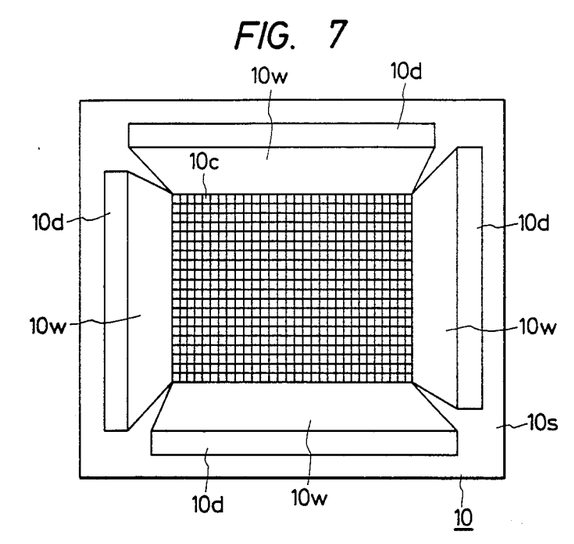
FIG. 7 is a plan view for explaining a two-dimensional recording head formed by a liquid crystal cell array which is employed in each embodiment of the present invention.
Figure 8A:
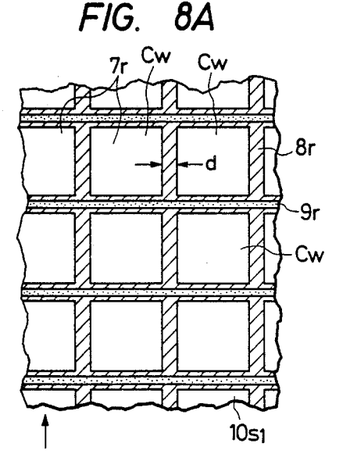
FIGS. 8A and 8B are plan views showing electrode structures formed on a pair of opposed substrates forming the liquid crystal cell array depicted in FIG. 7.
Figure 8B:
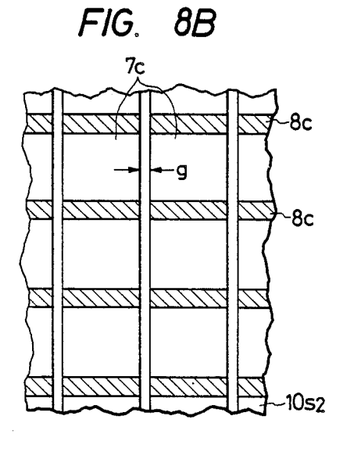

FIGS. 8A and 8B illustrate opposed electrode structures which are used in the case where the matrix crystal cell array 10c shown in FIG. 7 is formed in a direct multiplex addressed form. The electrodes are formed on a pair of opposed substrates $10s_1$ and $10s_2$ forming the cell array 10c. The electrode structure in FIG. 8A comprises spaced-apart row transparent electrodes 7r of the same number as that of the rows of the matrix and formed on the substrate $10s_1$ and row metal electrodes 8r formed on the row transparent electrodes 7r and having windows Cw. The row metal electrodes 8r are separated by light shielding layers 9r formed by printing an opaque resinous material so as to prevent leakage of light from portions other than the windows Cw.

The electrode structure in FIG. 8B comprises spaced-apart column transparent electrodes 7c of the same number as that of the columns of the matrix and formed on the substrate $10s_2$. The gap length g between adjacent column electrodes 7c is selected smaller than the width d of the metal electrode formed between adjacent windows Cw in the corresponding row in FIG. 8A. Accordingly, it is possible to form a matrix crystal cell array in which the row electrodes in FIG. 8A and the column electrodes in FIG. 8B are disposed opposite but cross each other at right angles and no light leaks from other portions than the windows Cw. Since the light shielding layers 9r in FIG. 8A somewhat transmit light therethrough, it is preferable that light-shielding metal layers 8c be provided on the column electrodes 7c at positions corresponding to the layers 9r. In this instance, the light-shield metal layers 8c may also be formed as metal electrodes having windows like the metal electrodes 8r, on the column electrodes 7c in FIG. 8B. The substrates $10s_1$ and $10s_2$ with the electrodes formed thereon as shown in FIGS. 8A and 8B are subjected to surface treatment for liquid crystal orientation and are assembled together in adjacent but spaced relation to form a cell assembly and then the space defined between the substrates $10s_1$ and $10s_2$ is filled with, for example, a ferroelectric liquid crystal material. In this way, the liquid crystal cell array 10c depicted in FIG. 7 is obtained. The two-dimensional recording head 10 is formed by sandwiching the liquid crystal cell array 10c between a pair of crossed-nicol polarizing plates (not shown) and providing the afore-mentioned drive circuits 10d along the marginal portions of the substrates 10s.

In such a direct multiplex addressed liquid crystal cell array, row and column access lines are wide and since unuseful areas between adjacent row electrodes 7r and between adjacent column electrodes 7c can easily be decreased, the effective area ratio or aperture ratio of each window Cw, expressed by Sw/Sc/N, can readily be increased, where Sw, Sc and N represent the area of each window, the total area of the matrix cell array 10c and the number of pixels (i.e. the number of cells), respectively. A large aperture ratio provides an advantage that recording with high color purity can be achieved by a color recording apparatus embodying the present invention.

On the other hand, an active matrix addressed liquid crystal cell array can also be applied to the two-dimensional recording head 10 of the recording apparatus of the present invention. In the liquid crystal cell array of this type, however, row and column access lines and thin film transistors, diodes or similar switching elements which are connected to respective pixel electrodes must be formed on only one of a pair of opposed substrates; and as a result the ineffective area of the cell array except for the pixel electrodes serving as the windows is large and the aperture ratio of each window diminishes accordingly. When this liquid crystal cell array is employed in the color recording apparatus, the ratio of an unexposed area to an exposed area in each pixel region to be recorded increases, lowering color purity.

Incidentally, the ferroelectric liquid crystal provides greater contrast than other liquid crystals, and hence is suitable for use in multi-gradation recording. In ordinary liquid crystal display devices it is necessary, for ensuring longer life and stable operation, that the polarity of a drive signal indicating the turning-ON or OFF (transmission or interception of light) of each pixel be inverted temporarily to thereby reduce to zero the total amount of charges fed to the pixel. This applies to the ferroelectric liquid crystal display device. In the case of dynamic driving of such an ordinary liquid crystal display device through refreshing 30 to 60 times per minute, for example, the temporary polarity inversion needs to be done for each refreshing. In the ferroelectric liquid crystal display device, however, the display state of each pixel is inverted by such polarity inversion of the drive voltage; and therefore when displaying a static image by dynamic driving, the temporary plurality inversion for each refreshing will lower the mean contrast which is observed at each pixel. Accordingly, in the case of photographing a static image displayed by using the ferroelectric liquid crystal display device as the two-dimensional recording head and through utilization of the above-said dynamic driving process, the contrast of the image will be lowered if the temporary polarity inversion for each refreshing is repeated during one exposure process. In color recording, such a decrease in contrast will lower the color purity of the image. Therefore, dynamic driving of the ferroelectric liquid crystal cell array impairs the high-contrast display capability that the ferroelectric liquid crystal possesses in itself.

On the other hand, the ferroelectric liquid crystal is suited to static driving because it retains its molecular orientation even after the removal of the applied voltage and consequently its display element has a self-storage function of its display state. In addition, the stored display state can be held for as long as several minutes or more, for instance. Accordingly, a static image can easily be maintained until its exposure is completed, simply by writing the image only once into a recording head using the ferroelectric liquid crystal cell array. Since the recording apparatus of the present invention performs exposure after writing an image signal into every liquid crystal cell, the afore-mentioned polarity inversion will not affect the exposure if a voltage reverse in polarity from the image signal is applied to each cell for a certain period immediately prior to the writing of the image signal, for example. This enables effective utilization of the high contrast that the ferroelectric liquid crystal possesses in itself.

As will be appreciated from the above, the recording apparatus of the present invention will implement the most excellent function by using, as the two-dimensional recording head, the direct multiplex addressed ferroelectric liquid crystal cell array of a large aperture ratio and by static driving of the cell array for image display.

Next, a description will be given of half-tone recording by use of the recording apparatus of the present invention. The gradation values of respective pixels are each represented by a binary number composed of a predetermined number of bits (n bits, for example), and the image data of an i-th bit plane composed of only values (1 or 0) of the same i-th bit (where $i=1, 2, \ldots, n$) of these gradation values are used to control the respective windows of the two-dimensional recording head 10 to permit or inhibit the passage therethrough of light (i.e. open or close the windows), thereby writing an image of the i-th bit plane into the head 10. Then the quantity of light corresponding to the weight $2^{i-1}$ of the i-th bit is applied accurately to the photosensitive sheet 16 by the recording apparatus of the present invention. Further, each window of the head 10 is opened or closed by the image data of another bit plane in accordance with the value of another bit (i.e. the value of another i) and the quantity of light corresponding to the weight of the said another bit. By repeating such exposure of the photosensitive sheet 16 a total of n times (that is, $i = 1, 2, \ldots, n$), recording with $2^n$ gradations can be achieved.

Figure 9A:
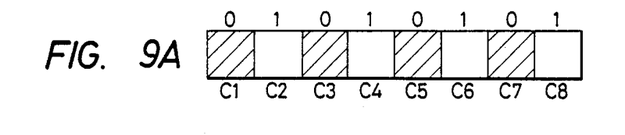
FIGS. 9A to 9D are diagrams showing opened and closed states of windows of the liquid crystal cell array, for explaining the principle of multiple-gradation recording by the recording apparatus of the present invention.

Turning next to FIGS. 9A to 9D, the principle of this half-tone recording will be described as being applied to the recording of eight different gradations 0 to 7 at eight pixel positions on the photosensitive sheet 16 through use of eight liquid crystal cells $C_1$ to $C_8$, for instance. In FIGS. 9A to 9D the eight liquid crystal cells are represented by blocks identified as $C_1$ to $C_8$. The gradation values 0 to 7 are expressed by 3-bit binary numbers 000, 001, 010, 011, 100, 101, 110 and 111, respectively. A group of values of first bits (LSB, in this example) of these binary numbers, (0, 1, 0, 1, 0, 1, 0, 1), is called a first bit plane. FIG. 9A shows the state in which these values are written, as an image signal, in the cells $C_1$ to $C_8$. Each cell is shown to be in the light intercepting (closed) or light transmitting (opened) state in accordance with the numerical value 0 or 1 indicated above the cell. The quantity of light corresponding to the weight $2^0$ (i.e. $2^{i-1}$, $i=1$) of the first bits expressed by the 3-bit binary numbers is applied to the photosensitive sheet 16 through the cells $C_1$ to $C_8$.

Figure 9B:
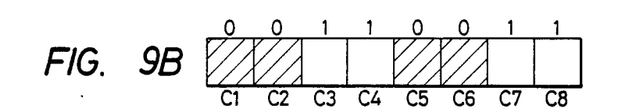
Figure 9C:
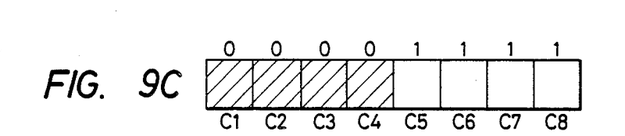
Figure 9D:
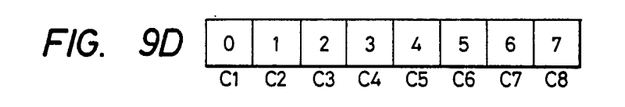

Next, values of the second bit plane (0, 0, 1, 1, 0, 0, 1, 1) are written, as an image signal, into the cells $C_1$ to $C_8$ as shown in FIG. 9B, and the quantity of light corresponding to the weight $2^1$ of the second bits is applied to the same photosensitive sheet 16 through the cells $C_1$ to $C_8$. Finally, values of the third bit plane (0, 0, 0, 0, 1, 1, 1, 1) are written, as an image signal, into the cells $C_1$ to $C_8$ as depicted in FIG. 9C, and the quantity of light corresponding to the weight $2^2$ of the third bits is applied to the same photosensitive sheet 16 through the cells $C_1$ to $C_8$. In this way, the photosensitive sheet 17 is exposed, at the pixel positions corresponding to the cells $C_1$ to $C_8$, to the total quantity of light of the value indicated in each block in FIG. 9D.

Now, a description will be given of the application of the principle of exposure for the 8-gradation recording to the exposure by one color light, for instance, red color light in the flowchart shown in FIG. 2. In the first ($i=1$) exposure process the exposure value Ev corresponding to the weight $2^0$ is set in the D-A converter 17c in FIG. 1 in step $S_2$; in step $S_3$ an image signal of the first bit plane is written into the head 10; and in steps $S_4$ to $S_7$ the first exposure is completed. In the second ($i=2$) exposure process the exposure value Ev corresponding to the weight $2^1$ is set in the D-A converter 17c in step $S_2$, the image data of the second bit plane is written into the head 10 in step $S_3$, and the second exposure is completed in steps $S_4$ to $S_7$. Similarly, in the third exposure process the exposure value Ev corresponding to the weight $2^2$ is set in the D-A converter 17c in step $S_2$, the image data of the third bit plane are written into the head 10 in step $S_3$, and the third exposure is completed in steps $S_4$ to $S_7$. Thus the exposure to the red light is carried out.

According to the principle of multi-gradation recording which utilizes a combination of amounts of exposure weighted by powers of 2, recording with $2^n$ gradations can be achieved by n exposure processes. Let it be supposed that an available maximum gradation value is always the same. Then, when it is desired, for example, to double the number of gradations $2^n$ (assume that a minimum exposure unit is $2^0 = 1$) to $2 \times 2^n = 2^{n+1}$, it is necessary only to add one $2^{-1}$ minimum unit exposure to n exposure processes needed when the number of gradations is $2^n$. In addition, the time for the $2^{-1}$ unit exposure is half as long as the time for $2^0$ unit exposure. In other words, even if the number of gradations is increased two-fold, only one additional exposure is needed and its exposure time is shorter than any others.

The quantity of light corresponding to the weight $2^{i-1}$ where $i=1, 2, \ldots, n$) of each bit of the n-bit gradation value may be obtained in terms of the exposure time proportional to the weight $2^{i-1}$, with the light intensity of the light source 11 held substantially constant, or by varying the light intensity (i.e. power) of the light source 11 in proportion to the weight $2^{i-1}$, with the exposure time held substantially constant. In the above it has been described, for a better understanding of the invention, that the exposure values for the n exposure processes are each the quantity of light proportional to the weight $2^{i-1}$ (where $i=1, 2, \ldots, n$). In practice, however, since the exposure characteristic (an exposure E vs. density D characteristic) of the photosensitive sheet 16 is nonlinear (the density being proportional to a logarithm of the exposure value E, i.e., $D = k \log E$), the exposure value need not always be proportional to the weight $2^{i-1}$ but may be set to a suitable value corresponding to the weight $2^{i-1}$ in consideration of the exposure characteristic of the photosensitive sheet 16. Further, while in the above the multiple exposure has been described to be carried out in order of increasing quantity of light, the order of exposures may be chosen at will.

In the case of recording a color image containing mixed colors the recording apparatus of the present invention needs only to expose the photosensitive sheet 16, such as a silver salt graphic film, n times for each of the three primary colors, through the head 10 after writing thereinto a corresponding color image signal. In this instance, the exposure takes place a total of $3 \times n$ times. Since the positions of the head 10, the image-forming lens 15 and the photosensitive sheet 16 can be fixedly held relative to one another throughout the entire exposure process, there are no possibilities of a color misregistration and moire which are caused by variations of the exposure position.

Figure 10:
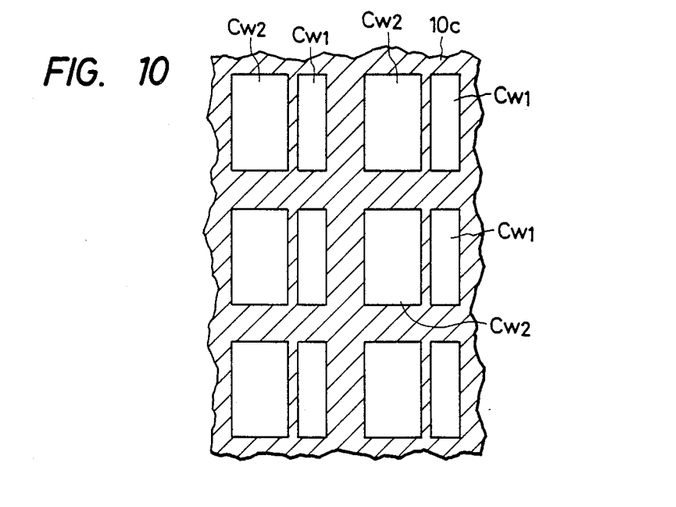
FIG. 10 is a diagram showing the shapes of windows of the liquid crystal cell array, for explaining another principle of the multiple-gradation recording by the recording apparatus of the present invention.

While in the above a plurality of gradations are implemented by a combination of exposure steps in each of which the quantity of light from the light source 11 is varied so that the amount of exposure is proportional to the weight $2^{i-1}$ (where i=1, 2, ..., n), it is also possible to hold the quantity of light from the light source 11 constant and control the head 10 so that the quantity of light which is transmitted through each window Cw of the head 10 is in proportion to the weight $2^{i-1}$. However, control of the transmittance of the liquid crystal cell in the same window Cw by voltage is not preferable, because instability of the control operation exerts a very great influence on the quantity of light being transmitted. This problem can be solved by maintaining the quantity of light from the light source 11 constant, dividing each window Cw of the liquid crystal cell array 10c into two windows $Cw_1$ and $Cw_2$ of different areas, as shown in FIG. 10, and selectively controlling them to open and close. For example, in FIG. 10, by selecting the areas of the windows $Cw_1$ and $Cw_2$ of each cell to correspond to $2^0$ and $2^1$ units, respectively, and combining their open and close operations, the mean amount of exposure in the corresponding pixel region on the photosensitive sheet 16 can be controlled to a desired one of the values 0, 1, 2, 3. Since the arbitrary combination of the windows $Cw_1$ and $Cw_2$ is performed by the drive circuit 10d, recording of a plurality of gradations can be achieved by one exposure process. Moreover, since the liquid crystal cell performs the ON-OFF (open-close) operation, variations in the applied voltage to the cell will have substantially no influence on the quantity of light being transmitted, if the applied voltage is sufficiently large as compared with a threshold value. The scatter of the quantity of light being transmitted depends solely on the scatter of the areas of the windows $Cw_1$ and $Cw_2$, but accurate window areas can easily be obtained by photolithography.

Figure 11A:
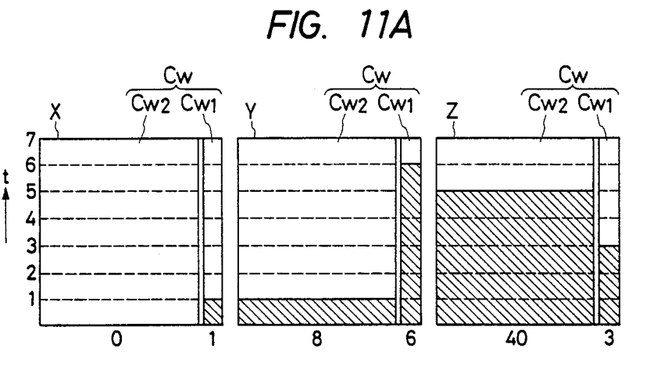
FIG. 11A is a diagram showing divided windows and the amounts of light for exposure therethrough, for explaining another principle of the multiple-gradation recording.

By combining selective control of the windows $Cw_1$ and $Cw_2$ of different areas as described above and the multi-gradation exposure technique described previously with regard to FIGS. 9A and 9D, recording with a very large number of gradations can be implemented by a small number of exposure processes. This will be described with reference to FIGS. 11A and 11B. FIG. 11A illustrates three consecutive liquid crystal cells X, Y and Z of the two-dimensional recording head 10. In this example, the windows $Cw_1$ and $Cw_2$ into which the window Cw of each cell is divided have the same length but their widths are selected in the ratio of 1:8. Accordingly, the ratio of area between the windows $Cw_1$ and $Cw_2$ is 1:8. The quantity of light which is emitted by the light source 11 is controlled so that the amounts of exposure may be in proportion to the weights $2^0$, $2^1$ and $2^2$, as in the case of FIGS. 9A to 9D, but in this example it is assumed, for the sake of brevity, that the intensity of light from the light source 11 is constant, and consequently the quantities of light emitted by the light source 11 (integrated values) which provide the amounts of exposure proportional to the weights are respectively expressed by exposure times t in terms of units $2^0$, $2^1$ and $2^2$. Further, the quantity of light or exposure E which is applied to the corresponding pixel region of the photosensitive sheet 16 through the smaller window $Cw_2$ by lighting the light source 11 for the time $t=2^0$ unit time is defined as a unit exposure, whose magnitude is expressed by the hatched region of the cell X in FIG. 11A, and the area of the hatched region is defined as a unit area. Accordingly, the vertical direction of the cell X in FIG. 11A expresses the exposure time t and one graduation is the unit time.

As will be seen from the above definitions, desired amounts of exposure E of 0, 1, 2, ..., 7 units can be obtained by using only the small window $Cw_1$ and combining the exposure times $2^0$, $2^1$ and $2^2$, and the amount of exposure E of any of 0, 8, 16, ..., 56 can be obtained by using only the larger window $Cw_2$ and combining the exposure times $2^0$, $2^1$ and $2^2$. Accordingly, the amounts of exposure E of any of integral units 0 to 63 can be obtained by combinations of the windows $Cw_1$ and $Cw_2$. FIG. 11A shows the case where the amounts of exposure E of 1, 14 and 43 units are applied through the cells X, Y and Z to the corresponding pixel areas of the photosensitive sheet 16, respectively. The total amounts of exposure intended for the respective pixel areas can be obtained by performing exposure of the $2^0$ unit time through the window $Cw_1$ in the cell X, exposure of the $2^1$ and $2^2$ unit times through the window $Cw_1$ and exposure of the $2^0$ unit time through the window $Cw_2$ in the cell Y, and exposure of $2^0$ and $2^1$ unit times through the window $Cw_1$ and exposure of the $2^0$ and $2^2$ unit times through the window $Cw_2$ in the cell Z.

Figure 11B:
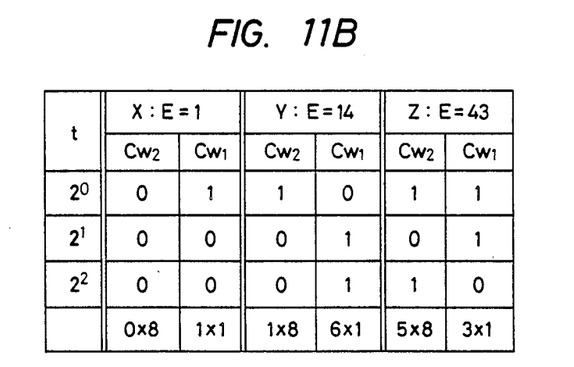
FIG. 11B is a table showing the opened and closed states of the divided windows in each exposure, for providing the amounts of exposure shown in FIG. 11A through respective liquid crystal cells.

FIG. 11B is a table showing the above-mentioned combinations of the windows $Cw_1$ and $Cw_2$ and the exposure times for performing the respective exposure in FIG. 11B. In the table the column t shows the exposure time and 0 and 1 in the columns $Cw_1$ and $Cw_2$ show the opening and closing of the windows. The lowest row indicates the total sums of the amounts of exposure E applied through the respective windows. The table indicates that the exposure times for all the windows $Cw_1$ and $Cw_2$ are only three kinds, that is, $2^0$, $2^1$ and $2^2$. Accordingly, a desired amount of exposure of any of the integral units 0 to 63 can be obtained by three exposure steps of these exposure times; namely, 64 gradations can be obtained by three exposure steps as in the example described previously with respect to FIGS. 9A to 9D. That is to say, by performing the first exposure through only the windows $Cw_1$ of the cell X, the window $Cw_2$ of the cell Y and the windows $Cw_1$ and $Cw_2$ of the cell Z for the $2^0$ unit time, the second exposure through only the window $Cw_1$ of the cell Y and the window $Cw_1$ of the cell Z for the $2^1$ unit time, and the third exposure through only the window $Cw_1$ of the cell Y and the window $Cw_2$ of the cell Z for the $2^2$ unit time, the amounts of exposure of 1, 14 and 43 units can be applied to the pixel areas of the photosensitive sheet corresponding to the cells X, Y and Z, respectively.

The present invention will be described further in connection with its concrete examples.

EXAMPLE 1

The direct multiplex addressed liquid crystal cell array 10c with the electrode structures of FIGS. 8A and 8B was produced as follows:

An indium oxide film of a 50 ohm surface resistance was formed over one surface of each of the substrates $10s_1$ and $10s_2$ and the films on the substrates were patterned by photolithography into row and column line electrodes. The metal layers 8r and 8c were formed by electroless plating of nickel. The windows were each formed in a size measuring 200 by 160 $\mu m^2$ and arrayed in a 100 by 100 matrix form. The substrates $10s_1$ and $10s_2$ were subjected to surface treatments for liquid crystal orientation through oblique vapor deposition of silicon oxide. The substrates $10s_1$ and $10s_2$ were assembled to oppose each other with a space defined therebetween by a 2 $\mu m$ thick spacer of glass fiber, and with their surface treatment directions held parallel to each other. The space defined by the spacer between the substrates was filled with a ferroelectric liquid crystal to form the liquid crystal cell array 10c. Polarizing plates were disposed on both sides of the liquid crystal cell array 10c and arranged so that their planes of polarization would cross each other at right angles (for intercepting light) during the application of a negative voltage. The access lines 7r and 7c were connected to the drive circuit 10d. The window Cw, when driven with 20 volts, rose and fell in about 0.5 milliseconds each, and the contrast of its storage state (after removal of the applied voltage) was 90:1.

Such a two-dimensional recording head 10 was built in the recording apparatus shown in FIG. 1 (strictly speaking, in FIG. 6), and an image of 64 gradations was recorded by carrying out exposures for the respective amounts of light of units "1", "2", "4", "8", "16" and "32" while rewriting the recording head 10 each time. As for color recording, an image of the three primary colors was recorded on an instant photographic film (FP-100 by Fuji Film Co., Ltd.), by repeating the above-mentioned exposures while exchanging the color filters 14R, 14B and 14G with one another in accordance with signals of the three primary colors.

The image thus recorded was excellent in the uniformity of the density of each pixel and entirely free from color misregistration. Further, 64 gradations were obtained for each of the three primary colors, and accordingly a vivid color images was obtained. In addition, the moire which often accompanies the recording in the three primary colors did not appear in the color image.

EXAMPLE 2

The apparatus of FIG. 1 was formed using, as the active matrix addressed liquid crystal cell array, a commercially available liquid crystal panel with thin film transistors (an electronic OHP transmission type panel with 400 by 640 pixels). The aperture ratio of this panel was 68%. The recording method and the photosensitive sheet used in this example were the same as those in Example 1. A color image obtained in this example was vivid and free from color misregistration. The time for recording was a total of about three seconds, and accordingly high-speed recording could be achieved.

EXAMPLE 3

As the two-dimensional recording head 10, a direct multiplex addressed driving super twist type liquid crystal cell array 10c having 400 by 640 cells was used in the recording apparatus of FIG. 1. The contrast of each cell was 15:1 and the aperture ratio of each window was 90%.

This apparatus was used to perform 64-gradation recording by carrying out exposures for the respective amounts of light of units "1", "2", "4", "8", "16" and "32" while rewriting the two-dimensional recording head 10 each time. In color recording, the color filters 14R, 14B and 14G were selectively used in accordance with signals of the three primary colors and the above-said exposures were repeated, thereby recording an image of the three primary colors on an instant photographic film (FP-100 by Fuji Film Co., Ltd.). In the image thus recorded there were substantially no unexposed portions between adjacent pixels, and accordingly a vivid color image with 64 gradations for each of the three primary colors could be obtained.

EXAMPLE 4

The same liquid crystal panel with thin film transistors as the panel used in Example 2 was employed as the two-dimensional recording head 10 of the recording apparatus shown in FIG. 4. The fluorescent lamps 11R, 11B and 11G of the three primary colors were lighted at high speed through use of a dimmer for high-frequency lighting use (by Matsushita Denki Co., Ltd., Model No. CHF81DZ24-XD3-040). The fluorescent lamps were each equipped with a filter of the corresponding color for increasing color purity.

The method of exposure and the photosensitive sheet used were the same as those utilized in Example 1. The exposure was similarly carried out six times for each color and the exposure time for each color was about one second. Accordingly, an image composed of 400 by 640 pixels could be obtained in three seconds or so. A vivid color image could be recorded at a very high speed.

EXAMPLE 5

The recording apparatus used in this example was the same as the apparatus employed in Example 4, except that xenon lamps were used in place of the fluorescent lamps. Since the xenon lamps emit white light, three kinds of color filters were attached to the xenon lamps, respectively. The exposure time was around 300 milliseconds for each color. Accordingly, an image composed of 400 by 640 pixels could be recorded in about one second. In this example image information could be written into the liquid crystal panel very quickly.

EXAMPLE 6

The recording apparatus shown in FIG. 5 was assembled using a two-dimensional recording head formed by a direct multiplex addressed ferroelectric liquid crystal cell array 10c with windows arranged in a 100 by 100 matrix form. The photosensor 12 was not used, and instead the exposure controller 17 was formed by a timer circuit. The rise and fall speeds of this liquid crystal cell array, when driven with 20 volts, were each about 0.5 milliseconds, and the contrast of its storage state was 90:1. The aperture ratio of each window was 90%.

Two-color recording with 64 gradations was performed by carrying out exposure in the same manner as in Example 1. An experiment of this recording was repeated 10 times and the experimental results were examined. The scatter of density was 0.01 or less, very stable exposure was achieved, and the reproducibility of the half tone was stable.

EXAMPLE 7

The two-dimensional recording head 10 provided with the divided windows $Cw_1$ and $Cw_2$ having an area ratio of 1:8 was fabricated in a similar manner as in Example 1. The windows $Cw_1$ and $Cw_2$ measured 200 by 200 $\mu m^2$, and 200 by 160 $\mu m^2$, respectively, and the number of windows Cw was 100 by 100. This two-dimensional recording head 10 was incorporated in the recording apparatus shown in FIG. 1, and exposure was carried out three times for the quantities of light of units "1", "2" and "4" while rewriting the recording head 10 each time. By this, the exposure was effected with 64 gradations per unit pixel through use of the combinations of the windows $Cw_1$ and $Cw_2$ as in the example shown in Figs. 11A and 11B. Also in this case, the color filters 14R, 14B and 14G were selectively used for exposure with gradations of the three primary colors and 64-gradation recording was performed for each color. A clear color image could be obtained and the total exposure time could be reduced substantially by half, as compared with the exposure time needed in Example 1.

It will be apparent that many modifications and variations can be effected without departing from the scope of the novel concepts of the present invention.

What is claimed is:

1. A recording apparatus comprising:
   a two-dimensional recording head having windows arranged in a matrix form, said windows being capable of controlling the transmission and interception of light in accordance with a binary image signal representing an image and retaining the transmitting and intercepting states;
   write control means for applying said image signal to said two-dimensional recording head so that the light transmitting or intercepting state corresponding to the image is written into each of said matrix-arranged windows in accordance with said image signal, said write control means including means for generating an exposure start signal after completion of writing the light transmitting and intercepting states into said two-dimensional recording head;
   light irradiating means disposed on one side of said two-dimensional recording head for irradiating said two-dimensional recording head with light;
   holding means fixedly positioned on the other side of said two-dimensional recording head for holding a recording medium;
   optical image forming means disposed between said two-dimensional recording head and said holding means for forming on said recording medium an optical image represented by the light transmitting and intercepting states of said matrix-arranged windows; and
   exposure control means for starting exposure of said recording medium to the optical image formed thereupon in response to said exposure start signal and controlling the exposure so that the total quantity of light which has been irradiated on said two-dimensional recording head since the generation of said exposure start signal becomes equal to a predetermined exposure value.

2. The recording apparatus of claim 1, wherein the exposure control means includes a photosensor which receives a portion of light from the light irradiating means, for detecting the quantity of light, integrating means for integrating the detected quantity of light, and comparing means for comparing the integrated output from the integrating means and the predetermined exposure value and controlling the exposure in accordance with the result of the comparison.

3. The recording apparatus of claim 2, wherein said exposure control means starts the integration of the quantity of light upon reception of said exposure start signal.

4. The recording apparatus of claim 1, wherein the light irradiating means includes a light source which emits light when supplied with power, and power supply means for supplying power to the light source until the quantity of light applied from the light source to the recording medium reaches the predetermined exposure value, the power supply means cutting off the power supply under control of the exposure control means.

5. The recording apparatus of claim 1, wherein said light irradiating means includes a light source which emits light when supplied with power, power supply means for supplying power to the light source, and shutter means disposed across an optical path from the light source to the recording medium, the shutter means being opened in response to said exposure start signal and closed when the total quantity of light applied from the light source to said two-dimensional recording head reaches the predetermined exposure value.

6. The recording apparatus of claim 1, wherein said light irradiating means includes a light source which emits light when supplied with power, and power supply means for supplying power to the light source in response to said exposure start signal, and wherein said exposure control means includes means for generating an exposure end signal, said exposure end signal being applied to the power supply means to cut off the power supply when the total quantity of light which has been applied from the light source to said two-dimensional recording head reaches the predetermined exposure value.

7. The recording apparatus of claim 1, wherein said light irradiating means includes a light source which emits light when supplied with power, power supply means for supplying power to the light source, and shutter means disposed across an optical path from said light source to said recording medium, wherein the exposure control means includes means for generating an exposure end signal when the total quantity of light applied from the light source to said two-dimensional recording head reaches the predetermined exposure value, the shutter means being responsive to said exposure start and end signals to open and close.

8. The recording apparatus of claim 6 or 7, wherein the exposure control means includes a photosensor which receives a portion of light from the light irradiating means, for detecting the quantity of light, and means for integrating the detected quantity of light by the photosensor, and wherein the exposure end signal generating means generates the exposure end signal when the integrated quantity of light reaches the predetermined exposure value.

9. The recording apparatus of claim 6 or 7, wherein the exposure control means includes timer means which generates the exposure end signal when a time corresponding to the predetermined exposure value elapses after receiving the exposure start signal.

10. The recording apparatus of claim 6 or 7, wherein the write control means includes means which performs exposure by applying to the two-dimensional recording head, as the image signal, bit values of common one of digits of all gradation values representing the gradations of all pixels by binary numbers composed of the same predetermined number of digits and applying a value corresponding to the weight of the common one of digits, as the predetermined exposure value, to the exposure control means and, thereafter, upon each reception of the exposure end signal, the write control means similarly repeats exposure for common one of the other digits of the gradation values.

11. The recording apparatus of claim 1, wherein the two-dimensional recording head includes a direct multiplex addressed liquid crystal cell array.

12. The recording apparatus of claim 11, wherein the liquid crystal cell array comprises a pair of opposed substrates, a plurality of transparent row electrodes formed on the inside surface of one of the substrates and extending in the row direction and a plurality of metal row electrodes respectively formed on the transparent row electrodes and having apertures defining the windows, a plurality of transparent column electrodes formed on the inside surface of the other substrate and extending in the column direction, and liquid crystal filling a space defined between the pair of opposed substrates.

13. The recording apparatus of claim 12, wherein the liquid crystal is ferroelectric liquid crystal.

14. The recording apparatus of claim 12, wherein the liquid crystal is super twist liquid crystal.

15. The recording apparatus of claim 1, wherein the two-dimensional recording head includes an active matrix addressed liquid crystal cell array which defines the respective windows.

16. The recording apparatus of claim 1, wherein the two-dimensional recording head includes a ferroelectric liquid crystal cell array which defines the respective windows.

17. The recording apparatus of claim 1, wherein the two-dimensional recording head includes a super twist type liquid crystal cell array which defines the respective windows.

18. The recording apparatus of claim 1, 12, 15, 16, or 17, wherein the windows are each composed of a plurality of windows of different areas.

19. The recording apparatus of claim 1, wherein a plurality of different color filters are provided in such a manner that a desired one of them can be inserted into the optical path from the light irradiating means to the recording medium.

20. The recording apparatus of claim 1, wherein the light irradiating means includes a light source and diffusing plate means disposed between the light source and the two-dimensional recording head.

21. The recording apparatus of claim 4, 6 or 20, wherein the light source includes a hot or cold cathode fluorescent tube.

22. The recording apparatus of claim 4, 6 or 20, wherein the light source includes a plurality of hot or cold cathode fluorescent tubes of different colors.

23. The recording apparatus of claim 4, 6 or 20, wherein the light source includes a plurality of light emitting diodes of different colors.

24. The recording apparatus of claim 4, 6 or 20, wherein the light source includes plural pairs of light emitting diodes, the light emitting diodes of each pair being different in color.

25. The recording apparatus of claim 21, wherein a plurality of different color filters are provided in such a manner that a desired one of them can be inserted into an optical path from the light source to the recording medium.

26. An image recording method comprising:
(a) a writing step in which respective windows of a matrix liquid crystal cell array of a two-dimensional recording head are each controlled to transmit therethrough or intercept light in accordance with a binary image signal representing an image and held in that state until at least one exposure step is completed;
(b) a step of generating an exposure start signal after completion of the writing step;
(c) an exposure step in which, in response to the exposure start signal, exposure is started to apply light from a light source to a recording medium, with each of the windows of the matrix liquid crystal cell array held in the light transmitting or intercepting state, and the integration of the quantity of light corresponding to that applied to the recording medium is started; and
(d) a step of stopping the exposure at the same time as the integrated value of the quantity of light reaches a predetermined exposure value.

27. The recording method of claim 26, wherein the writing step (a) is a step in which data of a bit plane composed of values of the same digit of gradation values representing the gradations of respective pixels by binary numbers of the same predetermined number of digits is written, as the image signal, into the two-dimensional recording head, the predetermined exposure value in the exposure stopping step (d) is a value corresponding to the weight of the said same digit, and the recording method includes a step of repeating the steps (a) to (d) for each digit of the binary numbers.

* * * * *